(12) United States Patent
Miki et al.

(10) Patent No.: US 11,112,806 B2
(45) Date of Patent: Sep. 7, 2021

(54) ROUTE ESTIMATION SYSTEM, ROUTE ESTIMATION METHOD AND NON-TRANSITORY COMPUTER-READABLE STORAGE MEDIUM FOR THE SAME

(71) Applicants: DENSO CORPORATION, Kariya (JP); TOHOKU UNIVERSITY, Sendai (JP)

(72) Inventors: Akira Miki, Kariya (JP); Masayuki Ohzeki, Sendai (JP)

(73) Assignees: DENSO CORPORATION, Kariya (JP); TOHOKU UNIVERSITY, Sendai (JP)

( * ) Notice: Subject to any disclaimer, the term of this patent is extended or adjusted under 35 U.S.C. 154(b) by 114 days.

(21) Appl. No.: 16/566,130

(22) Filed: Sep. 10, 2019

(65) Prior Publication Data

US 2020/0097022 A1    Mar. 26, 2020

(30) Foreign Application Priority Data

Sep. 21, 2018    (JP) .............................. JP2018-176928

(51) Int. Cl.
*G05D 1/02*    (2020.01)

(52) U.S. Cl.
CPC ......... *G05D 1/0289* (2013.01); *G05D 1/0212* (2013.01); *G05D 1/0291* (2013.01); *G05D 2201/0216* (2013.01)

(58) Field of Classification Search
CPC .. G05D 1/0289; G05D 1/0291; G05D 1/0212; G05D 2201/0216; G05D 1/0297; G05D 1/0274; G05D 1/0217; G01C 21/3446; G06Q 10/047
See application file for complete search history.

(56) References Cited

U.S. PATENT DOCUMENTS 9,285,218 B2 *    3/2016    Shekhar ............. G01C 21/3446
2006/0265103 A1    11/2006    Orita

* cited by examiner

*Primary Examiner* — Rodney A Butler
(74) *Attorney, Agent, or Firm* — Posz Law Group, PLC

(57) ABSTRACT

An optimum route of multiple mobile objects is estimated by: generating a time-series route candidate of a shortest route for each mobile object; generating a time-series route candidate of a detour route for each mobile object; calculating route assignment evaluation values for the shortest route and the detour route for each mobile object; calculating travel distance evaluation values for the shortest route and the detour route for each mobile object; calculating a route collision evaluation value of a combination for the shortest route and the detour route for each mobile object; and comparing a total value of the route assignment evaluation value, the travel distance evaluation value, and the route collision evaluation value for combinations of the time-series route candidates of the mobile objects, and estimating one of the combinations of the time-series route candidates of the mobile objects as the optimum route.

19 Claims, 8 Drawing Sheets

FIG. 2

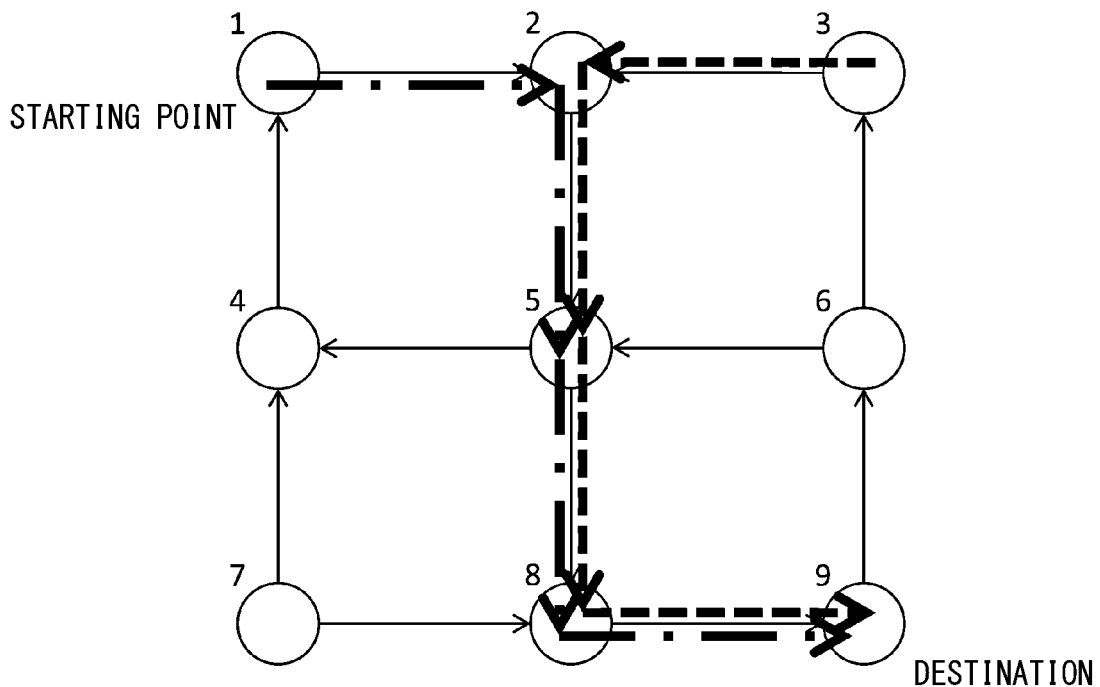

FIG. 3

```
1ST MOBILE OBJ                    2ND MOBILE OBJ
TIME-SERIES ROUTE CANDIDATE:      TIME-SERIES ROUTE CANDIDATE:
A[11111] ROUTE 1A                 B[33333] ROUTE 1B
A[12222] ROUTE 2A                 B[32222] ROUTE 2B
A[12555] ROUTE 3A                 B[32555] ROUTE 3B
A[12588] ROUTE 4A                 B[32588] ROUTE 4B
A[12589] ROUTE 5A                 B[32589] ROUTE 5B
A[11222] ROUTE 6A                 B[33222] ROUTE 6B
A[11225] ROUTE 7A                 B[33225] ROUTE 7B
A[11255] ROUTE 8A                 B[33255] ROUTE 8B
A[11258] ROUTE 9A                 B[33258] ROUTE 9B
A[11122] ROUTE 10A                B[33322] ROUTE 10B
A[11125] ROUTE 11A                B[33325] ROUTE 11B
A[11112] ROUTE 12A                B[33332] ROUTE 12B
A[12255] ROUTE 13A                B[32255] ROUTE 13B
A[12258] ROUTE 14A                B[32258] ROUTE 14B
A[12225] ROUTE 15A                B[32225] ROUTE 15B
A[12558] ROUTE 16A                B[32558] ROUTE 16B
```

|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 0 | 0 | 1 | 0 |

|  | ROUTE 1A | ROUTE 2A | ROUTE 3A | ROUTE 4A | ROUTE 5A | COST |
|---|---|---|---|---|---|---|
| 1ST MOBILE OBJ | 1 | 0 | 1 | 0 | 1 | 4 |

|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 0 | 0 | 1 | -4 |

|  | ROUTE 1A | ROUTE 2A | ROUTE 3A | ROUTE 4A | ROUTE 5A | COST |
|---|---|---|---|---|---|---|
| 1ST MOBILE OBJ | 1 | 0 | 0 | 0 | 0 | 0 |

FIG. 8A

|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 0 | 0 | 1 | 0 |

|  | ROUTE 1B | ROUTE 2B | ROUTE 3B | ROUTE 4B | ROUTE 5B | COST |
|---|---|---|---|---|---|---|
| 2ND MOBILE OBJ | 1 | 0 | 0 | 0 | 0 | 0 |

FIG. 8B

|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 0 | 0 | 1 | 1 |

|  | ROUTE 1B | ROUTE 2B | ROUTE 3B | ROUTE 4B | ROUTE 5B | COST |
|---|---|---|---|---|---|---|
| 2ND MOBILE OBJ | 0 | 0 | 0 | 0 | 1 | 1 |

FIG. 9

ROUTE ASSIGN EVAL VAL

|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 0 | 0 | 1 | 0 |

|  | ROUTE 1B | ROUTE 2B | ROUTE 3B | ROUTE 4B | ROUTE 5B | COST |
|---|---|---|---|---|---|---|
| 2ND MOBILE OBJ | 1 | 0 | 0 | 0 | 0 | 0 |

TRAVEL DIST EVAL VAL

|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 0 | 0 | 1 | -4 |

|  | ROUTE 1B | ROUTE 2B | ROUTE 3B | ROUTE 4B | ROUTE 5B | COST |
|---|---|---|---|---|---|---|
| 2ND MOBILE OBJ | 1 | 0 | 0 | 0 | 0 | 0 |

ROUTE COLLISION EVAL VAL

|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 0 | 0 | 1 | 0 |

|  | ROUTE 1B | ROUTE 2B | ROUTE 3B | ROUTE 4B | ROUTE 5B | COST |
|---|---|---|---|---|---|---|
| 2ND MOBILE OBJ | 1 | 0 | 0 | 0 | 0 | 0 |

$2^{n \times k}$

FIG. 12A
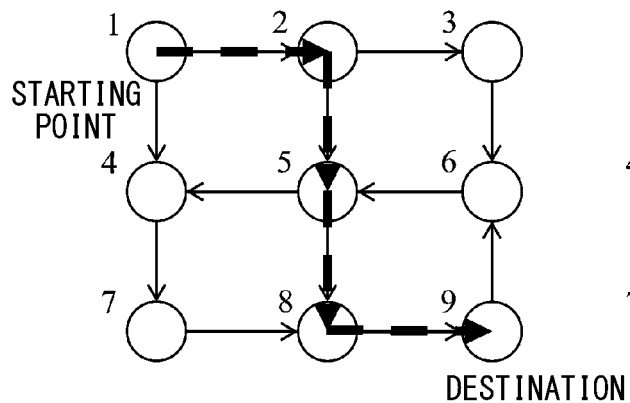
FIG. 12B
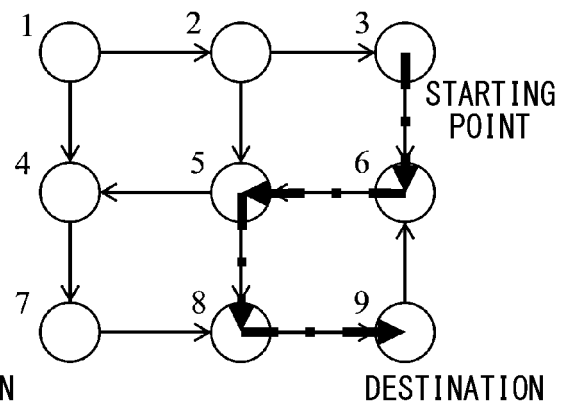
FIG. 13A
|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 0 | 1 | 0 | -3×0.9 |
|  | ROUTE 1B | ROUTE 2B | ROUTE 3B | ROUTE 4B | ROUTE 5B | COST |
|---|---|---|---|---|---|---|
| 2ND MOBILE OBJ | 0 | 0 | 1 | 0 | 0 | -2×0.5 |
FIG. 13B
|  | ROUTE 1A | ROUTE 2A | ROUTE 3A | ROUTE 4A | ROUTE 5A | COST |
|---|---|---|---|---|---|---|
| 1ST MOBILE OBJ | 0 | 0 | 1 | 0 | 0 | -2×0.9 |
|  | ROUTE 1B | ROUTE 2B | ROUTE 3B | ROUTE 4B | ROUTE 5B | COST |
|---|---|---|---|---|---|---|
| 2ND MOBILE OBJ | 0 | 0 | 0 | 1 | 0 | -3×0.5 | though 4, 8, 9, 10, and 11, but the distance cost of this detour route is 6.

ROUTE ESTIMATION SYSTEM, ROUTE ESTIMATION METHOD AND NON-TRANSITORY COMPUTER-READABLE STORAGE MEDIUM FOR THE SAME

CROSS REFERENCE TO RELATED APPLICATION

The present application claims the benefit of priority from Japanese Patent Application No. 2018-176928 filed on Sep. 21, 2018. The entire disclosure of the above application is incorporated herein by reference.

TECHNICAL FIELD

The present disclosure relates to a route estimation system, a route estimation method, and a non-transitory computer-readable storage medium for estimating a route when a plurality of mobile objects move simultaneously.

BACKGROUND

There is known a route estimation system which estimates an optimum route of each mobile object when a plurality of mobile objects move simultaneously. This route estimation system is applied, for example, as a system for determining a movement path of each robot so that each robot among a plurality of robots travelling autonomously in a factory can reach a respective destination faster without collision.

A robot control device optimizes the actions of a plurality of robots by controlling the plurality of robots to execute tasks at a minimum cost as a whole. This robot control device determines the possibility of encountering a plurality of robots (i.e., collision) while moving to obtain the encounter-attribute cost, and executes a plan in which the sum of the encounter-attribute cost and the movement plan execution cost is minimum.

SUMMARY

According to an example embodiment, an optimum route of multiple mobile objects is estimated by: generating a time-series route candidate of a shortest route for each mobile object; generating a time-series route candidate of a detour route for each mobile object; calculating route assignment evaluation values for the shortest route and the detour route for each mobile object; calculating travel distance evaluation values for the shortest route and the detour route for each mobile object; calculating a route collision evaluation value of a combination for the shortest route and the detour route for each mobile object; and comparing a total value of the route assignment evaluation value, the travel distance evaluation value, and the route collision evaluation value for combinations of the time-series route candidates of the mobile objects, and estimating one of the combinations of the time-series route candidates of the mobile objects as the optimum route.

BRIEF DESCRIPTION OF THE DRAWINGS

The above and other objects, features and advantages of the present disclosure will become more apparent from the following detailed description made with reference to the accompanying drawings. In the drawings:

FIG. 2 is a diagram showing an example of map data and a shortest route according to the embodiment of the present disclosure;

FIG. 3 is a diagram showing a time-series candidate group in the example of FIG. 2;

FIGS. 8A to 8B are diagrams showing an example of a route collision evaluation value according to the embodiment of the present disclosure;

FIG. 9 is a diagram showing an example of a total evaluation value of the embodiment of the present disclosure;

FIGS. 12A to 12B are diagrams showing a plurality of overlapping routes in the first modification of the embodiment of the present disclosure;

FIGS. 13A to 13B are diagrams showing an example of the calculation result of the distance cost when a coefficient is set to the mobile object in accordance with the priority in the second modification of the embodiment of the present disclosure;

DETAILED DESCRIPTION

There may be a difficulty in the method of selecting only the shortest route in consideration of the minimization of the distance. That is, when the shortest route is occupied by a certain mobile object, it is necessary for other mobile objects to stop moving temporarily when the other mobile objects move along the route. When the time period of the temporary stop is long, even if the shortest route is selected, the travel time may not always be minimal.

Figure 14:
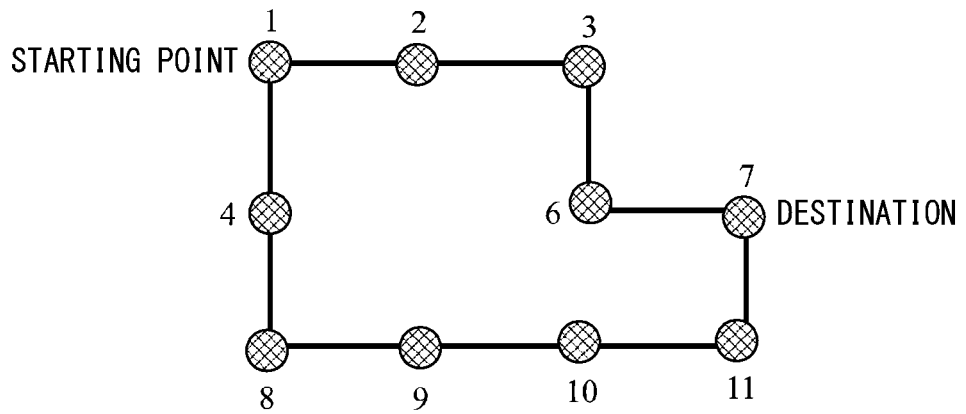
FIG. 14 is a diagram showing an example where the shortest route does not have the minimum cost.

FIG. 14 is a diagram showing an example where the shortest route does not have the minimum cost. Here, it is assumed that a plurality of robots A to D move from the start point 1 to the destination 7. For robots A to D, the shortest routes are the same route from 1 to 7 through 2, 3, and 6, and the distance cost of this route is 4. Each robot can take a detour route from the start point 1 to the destination 7 through 4, 8, 9, 10, and 11, but the distance cost of this detour route is 6.

Figure 15:
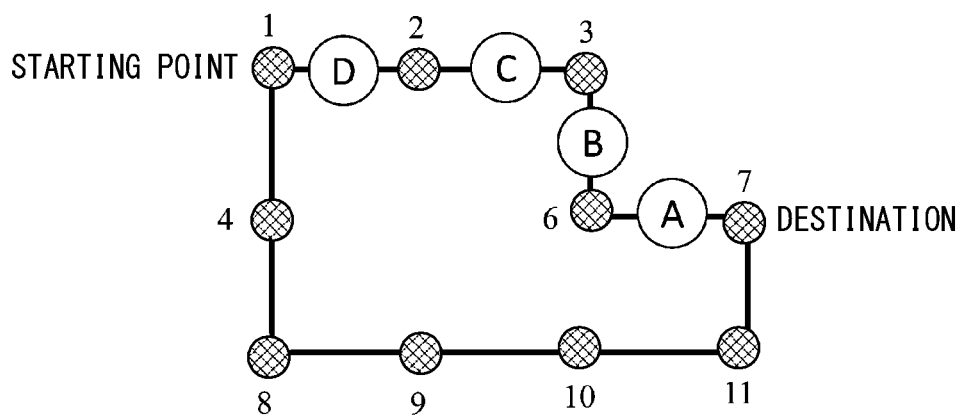
FIG. 15 is a diagram showing the movement for minimizing the distance cost in the example of FIG. 14.

FIG. 15 is a diagram showing the movement for minimizing the distance cost in the example of FIG. 14. Considering the minimization of distance cost, as shown in FIG. 15, the robots A to D all select the shortest route from 1 to 7 via 2, 3, and 6.

In this case, the movement control of the robots A to D is performed in the following procedure.

(1) The first robot A selects the shortest route, and the second to fourth robots B to D select temporary stop.

(2) The first robot A and the second robot B select the shortest route, and the third robot C and the fourth robot D select the temporary stop.

(3) The first to third robots A to C select the shortest route, and the fourth robot D selects the temporary stop.

(4) The robots A to D all select the shortest route.

As can be understood from the above procedure, the temporary stop occurs in the second to fourth robots B to D. The cost due to the temporary stop is defined as the stop cost, and the sum of the distance cost and the time cost is defined as the movement cost. The movement costs of the robots A to D are as follows.

Robot A: Distance cost of 4+Stop cost of 0=Movement cost of 4

Robot B: Distance cost of 4+Stop cost of 1=Movement cost of 5

Robot C: Distance cost of 4+Stop cost of 2=Movement cost of 6

Robot D: Distance cost of 4+Stop cost of 3=Movement cost of 7

Therefore, the total movement cost of the robots A to D is calculated by 4+5+6+7=22.

Figure 16:
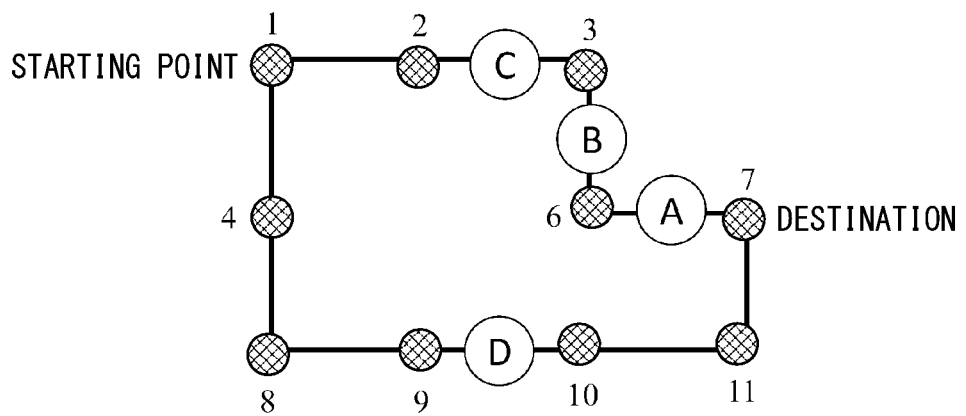
FIG. 16 is a diagram showing the movement in the case of taking a detour route in the example of FIG. 14.

FIG. 16 is a diagram showing the movement in the case of taking a detour route in the example of FIG. 14. In this example, the robot D selects a detour route. Specifically, the movement control of the robots A to D is performed in the following procedure.

(1) The first robot A selects the shortest route, the second robot B and the third robot C select the temporary stop, and the fourth robot D selects the detour route.

(2) The first robot A and the second robot B select the shortest route, the third robot C selects the temporary stop, and the fourth robot D selects the detour route.

(3) The first to third robots A to C select the shortest route, and the fourth robot D selects the detour route.

According to this procedure, the movement costs of the robots A to D are as follows.

Robot A: Distance cost of 4+Stop cost of 0=Movement cost of 4

Robot B: Distance cost of 4+Stop cost of 1=Movement cost of 5

Robot C: Distance cost of 4+Stop cost of 2=Movement cost of 6

Robot D: Distance cost of 6+Stop cost of 0=Movement cost of 6

Therefore, the total movement cost of the robots A to D is calculated by 4+5+6+6=21, and the total movement cost of the robots A to D is smaller than that of the example of FIG. 15 which passes only the shortest route.

Therefore, in an example embodiment, an optimum route including a detours route for a plurality of mobile object paths is estimated.

According to an example embodiment, a route estimation system (1) for estimating an optimum route of a plurality of mobile objects, includes: a shortest route generation unit (34) that generates a time-series route candidate of a shortest route for each of the plurality of mobile objects; a detour route generation unit (35) that generates a time-series route candidate of a detour route for each of the plurality of mobile objects; a route assignment evaluation value calculation unit (36) that calculates a route assignment evaluation value of a time-series route candidate of the shortest route and a route assignment evaluation value of a time-series route candidate of the detour route for each of the plurality of mobile objects; a travel distance evaluation value calculation unit (37) that calculates a travel distance evaluation value of a time-series route candidate of the shortest route and a travel distance evaluation value of a time-series route candidate of the detour route for each of the plurality of mobile objects; a route collision evaluation value calculation unit (38) that calculates a route collision evaluation value of each of a plurality of combinations of the time-series route candidate of the shortest route and the time-series route candidate of the detour route of the plurality of mobile objects; and an evaluation value comparison unit (39) that compares a total evaluation value of the route assignment evaluation value and the travel distance evaluation value and the route collision evaluation value for each combination of the time-series route candidates of the plurality of mobile objects, and estimates one of the combinations of the time-series route candidates of the plurality of mobile objects as an optimum candidate.

With this configuration, the route assignment evaluation value calculation unit, the travel distance evaluation value calculation unit, and the route collision evaluation value calculation unit respectively calculate the evaluation values for not only the shortest route but also the detour route, and the evaluation value comparison unit compares the total evaluation value of the evaluation values including the evaluation value of the detour route to estimate the optimum candidate. Thus, it is possible to estimate the optimum route including the detour route.

According to an example embodiment, each evaluation value is calculated for not only the shortest route but also the detour route, and the total evaluation value of the evaluation values including not only the evaluation value for the shortest route but also the evaluation value for the detour route is compared to estimate the optimum candidate. Thus, it is possible to estimate the optimal route including a detour route.

Hereinafter, embodiments of the present disclosure will be described with reference to the drawings. The embodiment described below shows an example in the case of practicing the present disclosure, and the present disclosure is not limited to the specific configuration described below. In the implementation of the present disclosure, a specific configuration according to the embodiment may be adopted as appropriate.

Figure 1:
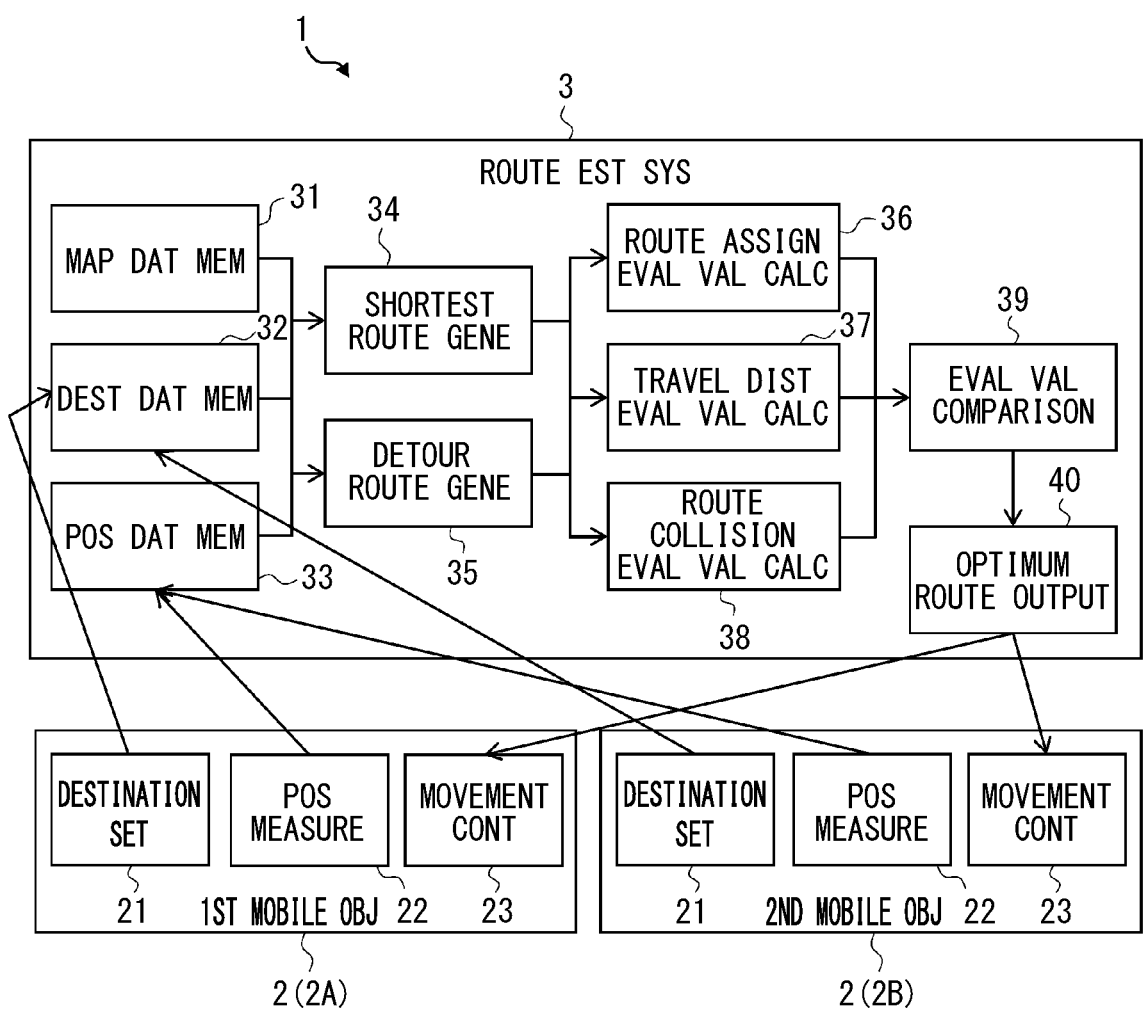
FIG. 1 is a diagram showing a usage situation of a robot control system including a route estimation system according to an embodiment of the present disclosure.

FIG. 1 is a block diagram showing a configuration of a robot control system according to an embodiment of the present disclosure. The robot control system 1 includes a plurality of mobile objects 2 and a route estimation system 3. The mobile objects 2 and the route estimation system 3 each have a wireless communication function although not shown, and each mobile unit 2 and the route estimation system 3 can wirelessly communicate with each other.

The mobile object 2 is an object whose route is to be estimated by the route estimation system 3. The mobile object 2 has a mechanism for moving although not shown. When the mobile object 2 is a work vehicle, the object 2 includes a wheel, a vehicle drive mechanism, and the like as a mechanism for moving. In the example of FIG. 1, the first mobile object 2A and the second mobile object 2B are shown as the plurality of mobile objects 2, and in the following description, in the case where there are two mobile objects in order to simplify the description, the estimation of the optimum route will be described. Alternatively, three or more mobile objects 2 may be disposed.

The route estimation system 3 estimates the optimum route of each mobile object 2 when a plurality of mobile objects 2 simultaneously move. The mobile object 2 moves in accordance with the route estimated by the route estimation system 3. The robot control system 1 can be applied, for example, as a system that picks up a package by controlling a plurality of mobile objects 2 to move in the warehouse according to the optimum route estimated by the route estimation system 3.

The route estimation system 3 includes a map data memory 31, a destination data memory 32, and a position data memory 33. The map data memory 31 stores map data of an area where the route estimation system 3 estimates a route. The map data includes information of nodes and links connecting the nodes, and a direction is defined for each link. The direction may be bi-directional from a node to another node or uni-directional from one node to another node.

The destination data memory 32 stores a node set as a destination for each mobile object 2. The destination is set in each mobile object 2, and the route estimation system 3 receives the information of the destination set in the mobile object 2, and sets the destination in the destination data memory 32 for each mobile object 2. The destination of each mobile object 2 may be set by another system that plans the movement of the mobile object 2, and transmitted to the route estimation system 3. For example, in the case where the mobile objects 2 in the system transport packages in a warehouse, the destination of each mobile object may be determined by the system which plans the transportation of the packages, and may be transmitted to the route estimation system 3. Alternatively, the route estimation system 3 itself may have a function of planning the movement of the mobile objects.

The position data memory 33 stores the current position of each mobile object 2. The current position is measured by each mobile object 2. The route estimation system 3 receives the information of the current position measured by each mobile object 2, and stores the current position in the position data memory 33 for each mobile object 2. The information on the current position of the mobile object 2 may be acquired by an external sensor (for example, a camera), and transmitted to the route estimation system 3.

The route estimation system 3 further includes a shortest route generation unit 34 and a detour route generation unit 35. The shortest route generation unit 34 reads the destination from the destination data memory 32 for each mobile object 2, reads the current position from the position data memory 33 as the starting point, and sets the destination and the starting point on the map stored in the map data memory 31 to find the shortest route from the starting point to the destination. At this time, the shortest route generation unit 34 selects only the possible traveling direction in consideration of the direction of each link in the map data. The shortest route is the route with the shortest distance, i.e., the route with the smallest distance cost.

The shortest route generation unit 34 generates a time-series route candidate including time-series positions for the shortest route. Specifically, the shortest route generation unit 34 generates all the patterns of how to move along the shortest route by selecting whether to go to the next node or to stop there at a predetermined number of time slot. Here, the time slot is defined as the time required for the mobile object to travel one link. The time slot is defined as n. It is possible to obtain time-series route candidates with the number of $2^n$ by selecting either forward or stop at each time slot. The time-series route is a node sequence indicating the position of each time slot by selecting forward or stop in the predetermined number of time slots.

FIG. 2 is a diagram showing an example of map data and the shortest route. FIG. 3 is a diagram showing a time-series candidate group in the example of FIG. 2. In the example of FIGS. 2 and 3, the map data includes nodes 1 to 9, the starting point of the first mobile object 2A is at the node 1, the destination of the first mobile object 2A is at the node 9, and the starting point of the second mobile object 2B is at the node 3. The shortest route of the first mobile object 2A is a route passing through the nodes 1, 2, 5, 8, and 9 in this order. The shortest route of the second mobile object 2B is a route passing through the nodes 3, 2, 5, 8, and 9 in this order.

The time slot is defined as 4. Time series route candidates of the shortest route of the first mobile object 2A and the second mobile object 2B are shown in FIG. 3, respectively. The shortest route generation unit 34 generates routes 1A to 16A as the time-series route candidates at the time slot 4 for the shortest route of the first mobile object 2A, and generates routes 1B to 16B as the time-series route candidates at the time slot 4 for the shortest route of the second mobile object 2B.

The detour route generation unit 35 obtains a route (i.e., a detour route) other than the shortest route from the starting point to the destination. Since the number of detour routes may be too large, the detour route generation unit 35 obtains the predetermined number of detour routes in ascending order of the distance cost.

The detour route generation unit 35 generates time-series route candidates for each of the plurality of obtained detour routes in the same manner as the shortest route generation unit 34. As a result, for each detour route, the time-series candidates of the first mobile object 2A and the second mobile object 2B are obtained as in FIG. 3.

The route estimation system 3 further includes a route assignment evaluation value calculation unit 36, a travel distance evaluation value calculation unit 37, and a route collision evaluation value calculation unit 38. These calculation units are realized by an Ising optimization computer such as a quantum computer executing a predetermined program.

The route assignment evaluation value calculation unit 36 reads out the time-series route candidates (hereinafter, also simply referred to as routes") for each mobile object 2, and outputs an evaluation value of the selected route assignment. The route assignment evaluation value calculation unit 36 calculates a route assignment evaluation value for the time-series route candidate of the shortest route read from the shortest route generation unit 34, and calculates a route assignment evaluation value for each detour route read from the detour route generation unit 35. Here, the route assignment evaluation value is one of the evaluation values for route optimization, and in order to assign only one route to each mobile object 2, the route assignment evaluation value becomes the smallest value when only one route is selected.

Figures 4, 5A, 5B:
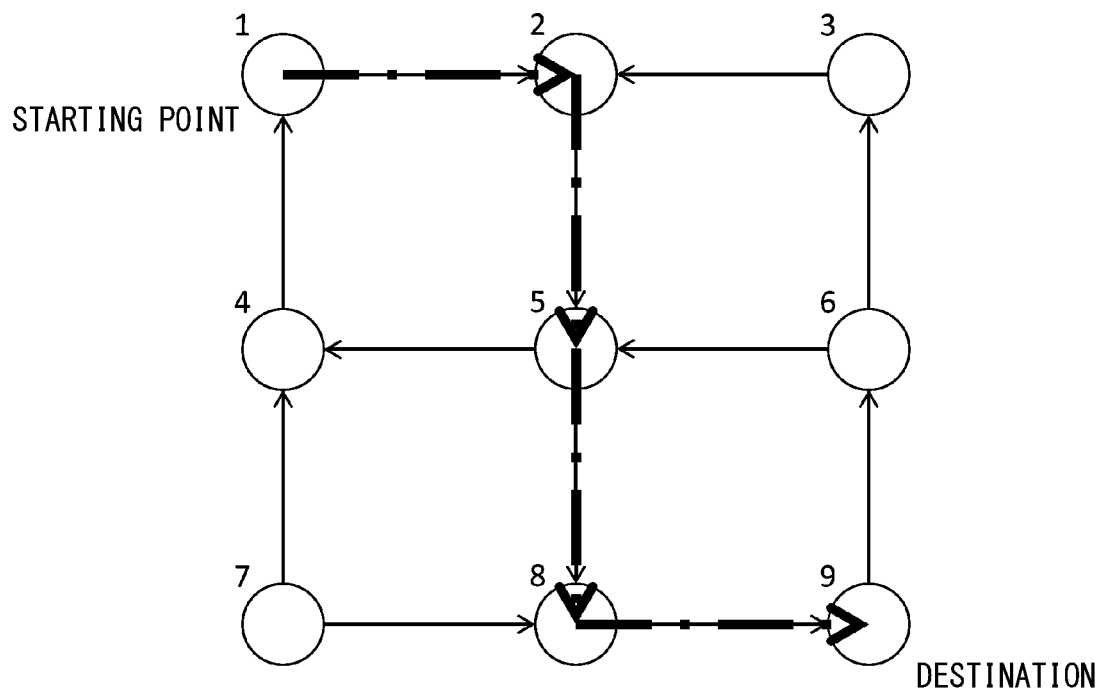
FIG. 4 is a diagram showing an example of a route of a first mobile object according to the embodiment of the present disclosure.
FIGS. 5A to 5B are diagrams showing an example of a route assignment evaluation value according to the embodiment of the present disclosure.

FIG. 4 is a diagram showing an example of the route of the first mobile object 2A. FIG. 5 is a diagram showing an example of an evaluation value of route assignment (hereinafter, also referred to as "assignment cost" or simply "cost"). In the example of FIG. 5, five routes of route 1A [11111], route 2A [12222], route 3 [12555], route 4 [12588], and route 5 [12589] are obtained as time-series route candidates in an example of the case. In FIGS. 5A to 5B, "1" for each route means selecting the route, and "0" means not selecting the route. FIG. 5A shows an example where the assignment cost is minimized, and FIG. 5B shows an example where the assignment cost is not minimized.

The route assignment evaluation value calculation unit 36 calculates a route assignment evaluation value using the cost function of the Ising model, as shown in equation (1). Specifically, the route assignment evaluation value calculation unit 36 uses, for each mobile object i, a cost function which results in cost of 0 (i.e., the minimum cost) when only one route is selected from the set of routes (x, s). Here, x is the coordinates of the mobile object, and s is the task of the mobile object, that is, the movement from the starting point to the destination.

$$\sum_{i=1}^{N}\left(\sum_{\mu \in M(x_i,s_i)} \sigma_{\mu,i} - 1\right)^2 \quad (1)$$

In the example of FIG. 5A, the cost is minimum of 0 because only the route 5A is selected, and in the example of FIG. 5B, the cost is 4 which is bigger than 0, because the routes 1A, 3A, and 5A are selected. Alternatively, the cost in the case of selecting a plurality of routes may be increased by multiplying the equation (1) by a sufficiently large coefficient. Also, in the example of FIGS. 5A to 5B, five time-series route candidates are obtained. The route assignment evaluation value calculation unit 36 calculates a route assignment evaluation value using equation (1) for all combinations of "1" to be selected and "0" not to be selected for these 16 routes since sixteen time-series candidates are obtained in the examples of FIGS. 2 and 3.

The travel distance evaluation value calculation unit 37 reads out time-series route candidates for each mobile object 2, and outputs an evaluation value of the selected route distance. The travel distance evaluation value calculation unit 37 calculates a travel distance evaluation value for the time-series route candidate of the shortest route read from the shortest route generation unit 34, and calculates a travel distance evaluation value for each detour route read from the detour route generation unit 35. Here, the travel distance evaluation value is one of the evaluation values for route optimization, and in order to select a route where the travel distance of each mobile object 2 is far, the travel distance evaluation value is defined as 0 when the travel distance is the longest one, and the travel distance evaluation value is negative when the travel distance is shorter than the longest one.

Figures 6A, 6B, 7:
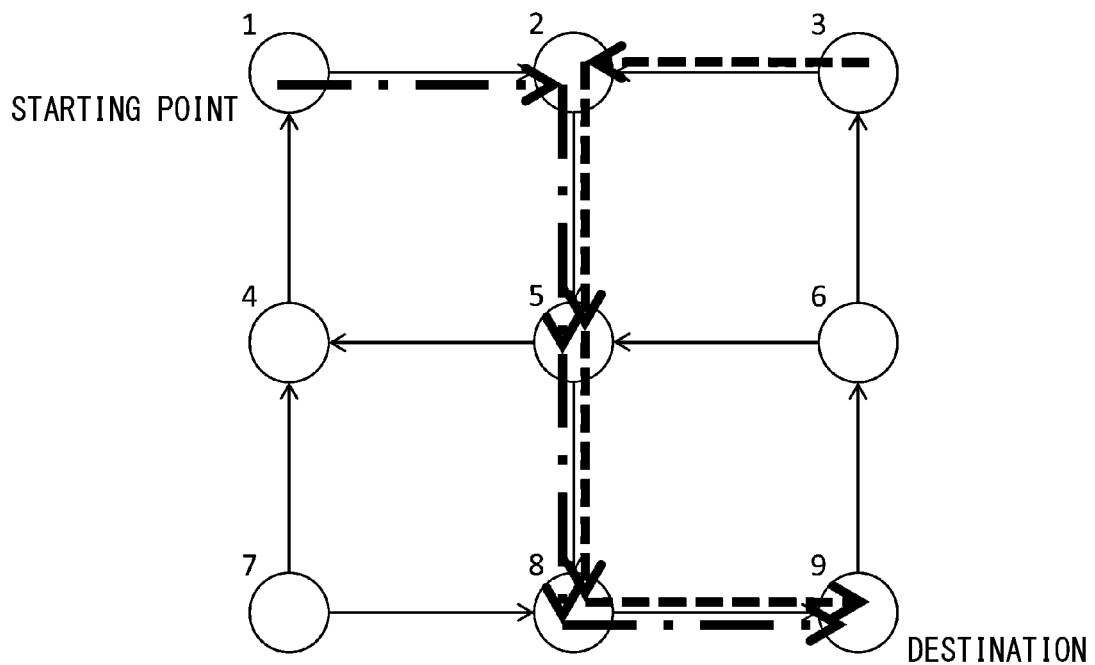
FIGS. 6A to 6B are diagrams showing an example of a travel distance evaluation value according to the embodiment of the present disclosure.
FIG. 7 is a diagram showing an example of routes of the first mobile object and the second mobile object according to the embodiment of the present disclosure.

FIGS. 6A and 6B are diagrams showing an example of the evaluation value of the travel distance (hereinafter, also referred to as "distance cost" or simply "cost"). Also in the example of FIGS. 6A and 6B, as the time-series route candidate of the first mobile object 2A, similar to FIGS. 5A and 5B, five candidates of route 1A [11111], route 2A [12222], route 3A [12555], route 4A [12588], and route 5A [12589] are obtained. In FIGS. 5A to 5B, "1" for each route means selecting the route, and "0" means not selecting the route. FIG. 6A shows an example where the distance cost is minimized, and FIG. 6B shows an example where the distance cost is not minimized.

The travel distance evaluation value calculation unit 37 calculates a travel distance evaluation value using the cost function of the Ising model. Specifically, the travel distance evaluation value calculation unit 37 uses a cost function in which the distance cost becomes −d for the shortest route when the route with the distance of d is selected among combinations (x, s) of routes for each mobile object i. The larger the d, the lower the distance cost.

The travel distance evaluation value calculation unit 37 adds, to the cost of −d, a cost of difference distance Δd from the shortest route for the detour route. As a result, the cost of −d approaches a positive value, and the distance cost increases.

The travel distance evaluation value calculation unit 37 calculates the distance cost using the cost function of Equation (2) for the shortest route. Here, similar to Equation (1), x is the coordinates of the mobile object, and s is the task of the mobile object, that is, the travel from the starting point to the destination.

$$-\sum_{i=1}^{N} \sum_{\mu \in M(x_i,s_i)} d_u \sigma_{\mu,i} \quad (2)$$

The travel distance evaluation value calculation unit 37 calculates the distance cost using the cost function of Equation (3) for the detour route. That is, the travel distance evaluation value calculation unit 37 adds distance evaluation value correction when calculating the distance cost for the detour route.

$$-\sum_{i=1}^{N} \sum_{\mu \in M(x_i,s_i)} (d_u - \Delta d) \sigma_{\mu,i} \quad (3)$$

In the example of FIG. 6A, the cost is the lowest of −4 because only the route 5A is selected, and in the example of FIG. 6B, the cost is 0 which is greater than −4 because only the route 1A is selected. Although FIGS. 6A and 6B show an example in which five time-series route candidates are obtained, in the examples of FIGS. 2 and 3, since sixteen time-series candidates are obtained, the route assignment evaluation value calculation unit 36 calculates the travel distance evaluation value using Equation (2) and Equation (3) for all combinations of "1" selected and "0" not selected for these 16 routes.

The route collision evaluation value calculation unit 38 reads out time-series route candidates for each mobile object, and outputs an evaluation value of the selected route collision. The route collision evaluation value calculation unit 38 calculates a route collision evaluation value for the time-series route candidate of the shortest route read from the shortest route generation unit 34, and calculates a route collision evaluation value for each detour route read from the detour route generation unit 35. Here, the route collision evaluation value is one of the evaluation values for route optimization, and in order to prevent each mobile object 2 from passing the same route simultaneously, the route collision evaluation value is 0 when there is no collision, and the route collision evaluation value is 1 or more when the collision occurs.

FIG. 7 is a diagram showing an example of the routes of the first mobile object 2A and the second mobile object 2B. FIGS. 8A and 8B are diagrams showing an example of an evaluation value of route collision (hereinafter, also referred to as "collision cost" or simply "cost"). In the example of FIGS. 8A and 8B, five routes, as the time-series route candidates of the first mobile object 2A, of route 1A [11111], route 2A [12222], route 3A [12555], route 4A [12588], and route 5A [12589] are obtained. Five routes, as the time-series route candidates of the second mobile object 2B, of route 1B [33333], route 2B [32222], route 3B [32555], route 4B [32588], and route 5B [32589] are obtained. In FIGS. 8A to 8B, "1" for each route means selecting the route, and "0"

means not selecting the route. FIG. 8A shows an example where the collision cost is minimized (i.e., no collision occurs), and FIG. 8B is a case where the collision cost is not minimized (i.e., a collision occurs).

The route collision evaluation value calculation unit 38 calculates a route collision evaluation value using the cost function of the Ising model, as shown in Equation (4). Specifically, the route collision evaluation value calculation unit 38 calculates, for each mobile object i, the overlapping cost when selecting a route from the combinations of routes (x, s). Here, x is the coordinates of the mobile object, and s is the task of the mobile object, that is, the movement from the starting point to the destination.

$$\sum_{t=1}^{T} \sum_{e(t) \in E} \left( \sum_{i=1}^{N} \sum_{\mu=M(x_i, s_i)} F_{\mu, e(t)} \sigma_{\mu, i} \right)^2 \quad (4)$$

In the example of FIG. 8A, only the route 5A is selected for the first mobile object 2A, and only the route 1A is selected for the second mobile object 2B, so that the collision cost is 0, which is the minimum. In the example of FIG. 8B, since the route 5A is selected for the first mobile object 2A, and the route 5B and route 1B are selected for the second mobile object 2B, the collision cost for each of the first mobile object 2A and the second mobile object 2B becomes 1 which is greater than 0. Alternatively, the cost in the case where a collision occurs may be increased by multiplying a sufficiently large coefficient to Equation (4). Also, in the example of FIGS. 8A to 8B, four time-series route candidates are obtained. The route collision evaluation value calculation unit 38 calculates a route collision evaluation value using Equation (4) for all combinations of "1" to be selected and "0" not to be selected for these 16 routes since sixteen time-series candidates are obtained in the examples of FIGS. 2 and 3.

The route estimation system 3 further includes an evaluation value comparison unit 39 and an optimum route output unit 40. The evaluation value comparison unit 39 outputs the time-series route of each mobile object, which has a minimum total evaluation value (hereinafter also referred to as "total cost") being a sum of the route assignment evaluation value (i.e., assignment cost), the route distance evaluation value (i.e., distance cost), and the route collision evaluation value (i.e., collision cost) for each combination of route selection.

FIG. 9 is a diagram showing an example of the total evaluation value. FIG. 9 shows the total evaluation value when the first mobile object 2A selects only the route 5 and the second mobile object 2B selects only the route 1, and the total evaluation value is −4. When the number of mobile objects 2 is defined as n, and the number of time-series route candidates is defined as k, the total evaluation values with the number of $2^{n \times k}$ are obtained. Therefore, when the variables such as the number of mobile objects and the number of time-series route candidates increase, the combinations increase explosively, so that an Ising optimization computer such as quantum computer may be used.

The evaluation value comparison unit 39 compares a plurality of obtained total evaluation values with one another, and selects a combination of time-series routes that has the minimum total evaluation value.

The optimum route output unit 40 outputs the combination of the time series routes selected by the evaluation value comparison unit 39 and having the smallest total evaluation value to each mobile object 2 as the estimated optimum route.

As shown in FIG. 1, each mobile object 2 includes a destination setting unit 21, a position measurement unit 22, and a movement control unit 23. The destination setting unit 21 sets a destination, that is, the movement goal of the mobile object 2, and transmits the set destination to the route estimation system 3. The route estimation system 3 receives the destination of each mobile object 2 transmitted from each mobile object 2, and stores the destination in the destination data memory 32. Note that, as described above, the destination may be determined by a system other than the mobile object 2.

The position measurement unit 22 measures the current position of the mobile object 2, and generates position information. The position measurement unit 22 measures the position using GPS. The position measurement unit 22 measures the current position of the mobile object 2, and transmits information of the measured current position to the route estimation system 3. The route estimation system 3 receives the position information of the current position of each mobile object 2 transmitted from each mobile object 2, and stores the information in the position data memory 33. As described above, the current position of each mobile object 2 may be measured by an external sensor.

The movement control unit 23 controls the mobile object 2 to move by driving the movement mechanism of the mobile object 2. The movement control unit 23 receives the optimum route estimated by the route estimation system 3 and transmitted from the optimum route output unit 40, and the unit 23 drives the movement mechanism of the mobile object 2. By controlling the movement mechanism using the movement control unit 23, the mobile object 2 moves according to the optimum route in the predetermined number of time slots.

Figure 10:
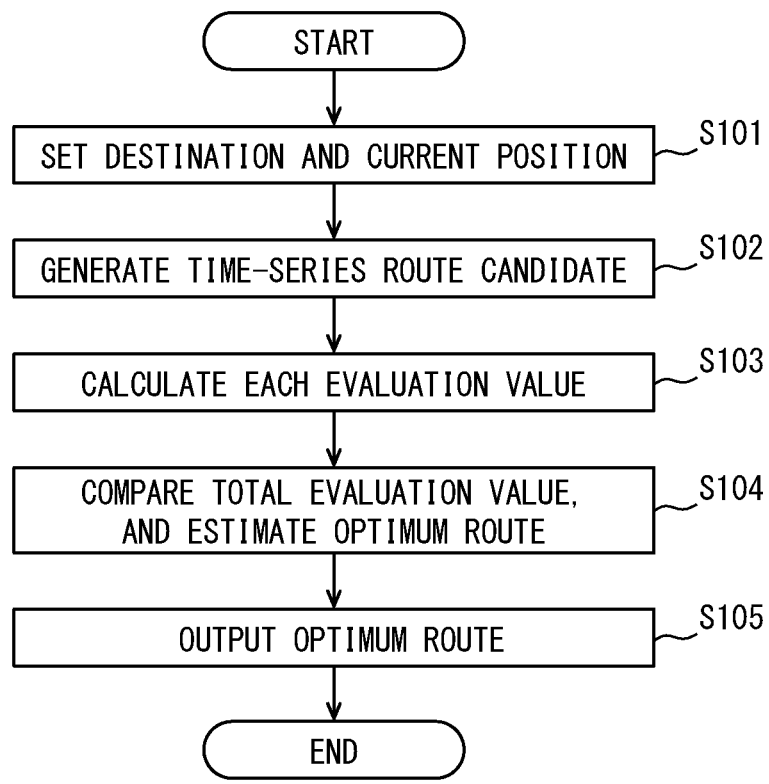
FIG. 10 is a flowchart of a route estimation method according to an embodiment of the present disclosure.

FIG. 10 is a flowchart of a route estimation method according to an embodiment of the present disclosure. First, the route estimation system 3 sets the destinations of all the mobile objects 2 in the destination data memory 32, and sets the current positions of all the mobile objects 2 in the position data memory 33 (at step S101). Next, the shortest route generation unit 34 generates a time series route candidate of the shortest route of each mobile object 2, and the detour route generation unit 35 generates a time series route candidate of each detour route of each mobile object (at step S102).

Next, the route assignment evaluation unit 36 calculates a route assignment evaluation value of each time-series route candidate, and the travel distance evaluation value calculation unit 37 calculates a movement distance evaluation value of each time-series route candidate, and the route collision evaluation value calculation unit 38 calculates the route collision evaluation value of each combination of time-series path candidates of a plurality of mobile objects 2 (at step S103). Then, the evaluation comparison unit 39 calculates the total evaluation value of each combination of the time-series route candidates of the plurality of mobile objects 2 by summing the route assignment evaluation value, the travel distance evaluation value, and the route collision evaluation value. The unit 39 compares the total evaluation value of each combination with each other, and estimates one of the combinations of the time-series route candidates having the minimum total evaluation value as the optimum route (at step S104).

The optimal route output unit 40 transmits the route determined as the optimum route by the evaluation comparison unit 39 to each mobile object 2 (at step S105). Each mobile object 2 receives the optimum route from the route estimation system 3, and the movement control unit 23 drives the movement mechanism of the mobile object 2 to move the mobile object 2 according to the optimum route.

As described above, in the route estimation system 3 according to the embodiment of the present disclosure and the robot control system 1 including the same, based on the situation such that the shortest route does not necessarily become the optimum route, not only the time-series route candidate group for the shortest route is generated by the shortest route generation unit 34, but the detour route generation unit 35 also generates the time-series route candidate group for the detour route that is not the shortest. Then, the costs are calculated not only for the shortest route but also for the detour route, and the costs are compared with each other. Therefore, when the cost of the detour route is smaller, the detour route is selected. Thus, it is possible to obtain the optimum route including the detour route, and it is possible to obtain a route as an optimum route with a smaller cost than a case where the optimum route is obtained by using only the shortest route.

In addition, the shortest route generation unit 34 and the detour route generation unit 35 generate a time-series route candidate group including a combination of forward and/or stop of the mobile object 2 with the predetermined number of time slots, and the route assignment evaluation value calculation unit 36, the travel distance evaluation value calculation unit 37 and the route collision evaluation value calculation unit 38 calculate each cost for all time-series route candidates or for all combinations of time-series route candidates of a plurality of mobile objects 2. When the number of mobile objects 2 is increased and the number of time slots is increased, the amount of calculation for calculating these costs is huge. By providing the route assignment evaluation value calculation unit 36, the travel distance evaluation value calculation unit 37 and the route collision evaluation value calculation unit 38 with an Ising optimization computer such as a quantum computer, the calculation may be performed at high speed.

Further, since the evaluation comparison unit 39 also calculates the total evaluation values of the combinations of time-series routes of all the mobile objects 2, the calculation amount increases exponentially as the number of mobile objects 2 and the number of time slots increase. Therefore, the calculation may be performed at high speed by providing the evaluation comparison unit 39 using an Ising optimization computer such as a quantum computer.

(First Modification)

In the route estimation system 3, when the shortest route generation unit 34 finds the shortest routes of a plurality of mobile objects 2, and there is no duplication in the shortest routes, the shortest routes may be adopted as an optimum route. When there is an overlap in the shortest routes, and there is no overlap in the detour routes of the plurality of mobile objects 2 in a case where the detour route generation unit 35 obtains the detour routes, the route estimation system 3 may adopts the detour route as the optimum route.

FIG. 11 shows a plurality of routes without duplication, and FIG. 12 shows a plurality of routes with duplication. The shortest route generation unit 34 and the detour route generation unit 35 generate the time series route candidate group of the shortest route and the detour route only when the routes overlap with each other, and the route assignment evaluation value calculation unit 36, the travel distance evaluation value calculation unit 37 and the route collision evaluation value calculation unit 38 calculate each evaluation value of the time-series route candidates of the route only when the routes of a plurality of mobile objects 2 overlap with each other.

Figure 11A:
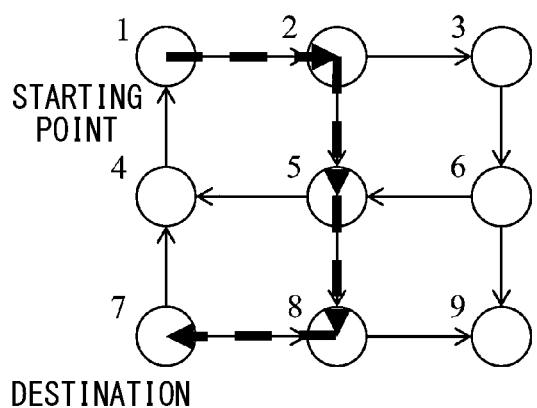
FIGS. 11A to 11B are diagrams showing a plurality of non-overlapping routes in a first modification of the embodiment of the present disclosure.
Figure 11B:
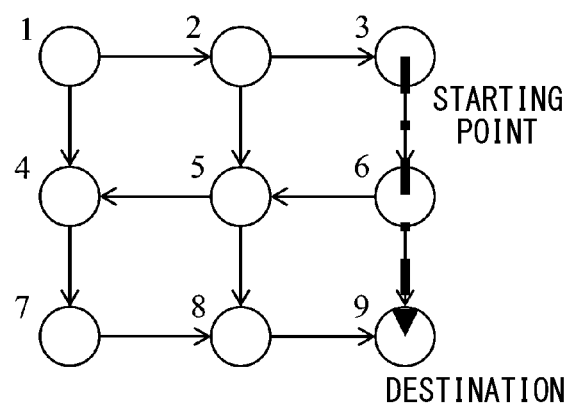

In the example of FIGS. 11A and 11B, as shown in FIG. 11A, the starting point of the first mobile object 2A is at the node 1, and the destination is at the node 7. Also, as shown in FIG. 11B, the starting point of the second mobile object 2B is at the node 3, and the destination is at the node 9. In this case, the shortest route of the first mobile object 2A is a route of [12587], and the shortest route of the second mobile object 2B is a route of [369--], and these routes do not overlap with each other. Therefore, these shortest routes are determined as optimum routes.

In the example of FIGS. 12A and 12B, as shown in FIG. 12A, the starting point of the first mobile object 2A is at the node 1, and the destination is at the node 9. Also, as shown in FIG. 12B, the starting point of the second mobile object 2B is at the node 3, and the destination is at the node 9. In this case, the shortest route of the first mobile object 2A is a route of [12589], the shortest route of the second mobile object 2B is a route of [36589], and these routes overlap with each other in a route of [--589]. Therefore, the shortest route generation unit 34 creates a time-series route candidate group for these routes, and the route assignment evaluation value calculation unit 36, the travel distance evaluation value calculation unit 37, and the route collision evaluation value calculation unit 38 calculate each evaluation value as described above.

As described above, when the routes of the plurality of mobile objects 2 generated by the shortest route generation unit 34 and the detour route generation unit 35 do not overlap with each other, the optimum route is estimated with high speed by immediately determining these routes as the optimum routes so that the calculation load for estimating the optimum route is reduced.

(Second Modification)

The travel distance evaluation calculation unit 37 sets a priority for each mobile object 2, and sets different coefficients according to the priority for each mobile object 2 in the equations (2) and (3) so that the travel distance evaluation value of the mobile object 2 having a higher priority becomes smaller.

FIG. 13 shows an example of the calculation result of the distance cost when the coefficient according to the priority is set for each mobile object 2. In this example, the priority of the first mobile object 2A is higher than the priority of the second mobile object 2B, and thus the coefficient is set to 0.9 for the first mobile object 2A, and the coefficient for the second mobile object 2B is set to 0.5 that is smaller than 0.9.

As a result, in the case of FIG. 13A, the distance cost of the first mobile object 2A is originally −3, and the distance cost of the second mobile object 2B is −2, so that the distance cost of the first mobile object 2A is smaller, and the magnitude relation of the distance costs does not change even when the coefficients 0.9 and 0.5 are respectively multiplied with the distance costs. However, in the case of FIG. 13B, the distance cost of the first mobile object 2A is originally −2, and the distance cost of the second mobile object 2B is −3, so that the distance cost of the second mobile object 2B is smaller, and the distance cost of the first mobile object 2A becomes −1.8 and the distance cost of the second mobile object 2B becomes −1.5 when the coefficients 0.9 and 0.5 are respectively multiplied with the distance costs. Thus, the distance cost of the first mobile object 2A becomes smaller.

As a result, the mobile object 2 with high priority is less likely to be blocked by the mobile object 2 with low priority, and tasks may be executed preferentially.

(Third Modification)

As a result of comparing the total evaluation values, when there are a plurality of combinations of time-series routes of a plurality of mobile objects with the lowest cost, the evaluation comparison unit 39 may determine a combination of the time-series routes with the smallest distance cost of the mobile object with high priority as the optimum routes. The priority order is predetermined for a plurality of mobile objects 2, and may be stored in the evaluation comparison unit 39.

As a result, when there are combinations of a plurality of time-series routes having the same total evaluation value, a route in which the mobile object 2 having a higher priority gets closer to the destination is estimated as the optimum route. Therefore, the task of the mobile object 2 with high priority is prioritized.

As described above, the above system has an effect of estimating an optimum route including a detour route for a plurality of mobile object routes, and is useful as a route estimation system or the like.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A route estimation system for estimating an optimum route of a plurality of mobile objects, comprising:
   a processor comprising one or more hardware logic circuits configured to:
      generate a time-series route candidate of a shortest route for each of the plurality of mobile objects;
      generate a time-series route candidate of a detour route for each of the plurality of mobile objects;
      calculate a route assignment evaluation value of the time-series route candidate of the shortest route and a route assignment evaluation value of the time-series route candidate of the detour route for each of the plurality of mobile objects;
      calculate a travel distance evaluation value of the time series route candidate of the shortest route and a travel distance evaluation value of the time series route candidate of the detour route for each of the plurality of mobile objects;
      calculate a route collision evaluation value of a combination of the time series route candidate of the shortest route and the time series route candidate of the detour route for each of the plurality of mobile objects;
      compare a total value of the route assignment evaluation value, the travel distance evaluation value, and the route collision evaluation value for combinations of the time-series route candidates of the plurality of mobile objects, and estimate one of the combinations of the time-series route candidates of the plurality of mobile objects as the optimum route including the detour route; and
      output the optimum route to each of the plurality of mobile objects to control movement thereof.

2. The route estimation system according to claim 1, wherein:
   the processor is further configured to add a correction according to a difference in distance between the detour route and the shortest route when calculating the travel distance evaluation value of the time series route candidate of the detour route.

3. The route estimation system according to claim 1, wherein:
   the processor is further configured to set a coefficient that the route assignment evaluation value becomes larger than a predetermined value when a plurality of time-series route candidates are selected for each of the plurality of mobile objects.

4. The route estimation system according to claim 1, wherein:
   the processor is further configured to calculate the travel distance evaluation value by setting a different coefficient for each of the plurality of mobile objects according to a priority that the travel distance evaluation value of one of the mobile objects having a higher priority becomes smaller.

5. The route estimation system according to claim 1, wherein:
   the processor is further configured to set a coefficient that the route collision evaluation value becomes larger than a predetermined value when the plurality of mobile objects collide with each other.

6. The route estimation system according to claim 1, wherein:
   when the shortest route of each of the plurality of mobile objects does not overlap with each other, the shortest route is estimated as the optimum route.

7. The route estimation system according to claim 1, wherein:
   when a plurality of combinations of the time-series route candidates of the plurality of mobile objects have a same total value, one of the combinations of the time-series route candidates of the plurality of mobile objects is estimated as the optimum route when the travel distance evaluation value of one of the mobile objects having a higher priority becomes lower.

8. A non-transitory computer readable storage medium comprising instructions for execution by a computer, the instructions including a computer-implemented method for estimating an optimum route of a plurality of mobile objects, the instructions including:
  generating a time-series route candidate of a shortest route for each of the plurality of mobile objects;
  generating a time-series route candidate of a detour route for each of the plurality of mobile objects;
  calculating a route assignment evaluation value of the time-series route candidate of the shortest route and a route assignment evaluation value of the time-series route candidate of the detour route for each of the plurality of mobile objects;
  calculating a travel distance evaluation value of the time series route candidate of the shortest route and a travel distance evaluation value of the time series route candidate of the detour route for each of the plurality of mobile objects;
  calculating a route collision evaluation value of a combination of the time series route candidate of the shortest route and the time series route candidate of the detour route for each of the plurality of mobile objects;
  comparing a total value of the route assignment evaluation value, the travel distance evaluation value, and the route collision evaluation value for combinations of the time-series route candidates of the plurality of mobile objects, and estimating one of the combinations of the time-series route candidates of the plurality of mobile objects as the optimum route including the detour route; and
  outputting the optimum route to each of the plurality of mobile objects to control movement thereof.

9. A route estimation method for estimating an optimum route of a plurality of mobile objects, comprising:
  generating a time-series route candidate of a shortest route for each of the plurality of mobile objects;
  generating a time-series route candidate of a detour route for each of the plurality of mobile objects;
  calculating a route assignment evaluation value of the time-series route candidate of the shortest route and a route assignment evaluation value of the time-series route candidate of the detour route for each of the plurality of mobile objects;
  calculating a travel distance evaluation value of the time series route candidate of the shortest route and a travel distance evaluation value of the time series route candidate of the detour route for each of the plurality of mobile objects;
  calculating a route collision evaluation value of a combination of the time series route candidate of the shortest route and the time series route candidate of the detour route for each of the plurality of mobile objects;
  comparing a total value of the route assignment evaluation value, the travel distance evaluation value, and the route collision evaluation value for combinations of the time-series route candidates of the plurality of mobile objects, and estimating one of the combinations of the time-series route candidates of the plurality of mobile objects as the optimum route including the detour route; and
  outputting the optimum route to each of the plurality of mobile objects to control movement thereof.

10. The non-transitory computer readable storage medium according to claim 8, the instructions further including:
  adding a correction according to a difference in distance between the detour route and the shortest route when calculating the travel distance evaluation value of the time series route candidate of the detour route.

11. The non-transitory computer readable storage medium according to claim 8, the instructions further including:
  setting a coefficient that the route assignment evaluation value becomes larger than a predetermined value when a plurality of time-series route candidates are selected for each of the plurality of mobile objects.

12. The non-transitory computer readable storage medium according to claim 8, the instruction further including:
  calculating the travel distance evaluation value by setting a different coefficient for each of the plurality of mobile objects according to a priority that the travel distance evaluation value of one of the mobile objects having a higher priority becomes smaller.

13. The non-transitory computer readable storage medium according to claim 8, the instructions further including:
  setting a coefficient that the route collision evaluation value becomes larger than a predetermined value when the plurality of mobile objects collide with each other.

14. The non-transitory computer readable storage medium according to claim 8, wherein:
  when the shortest route of each of the plurality of mobile objects does not overlap with each other, the shortest route is estimated as the optimum route.

15. The route estimation method according to claim 9, further comprising:
  adding a correction according to a difference in distance between the detour route and the shortest route when calculating the travel distance evaluation value of the time series route candidate of the detour route.

16. The route estimation method according to claim 9, further comprising:
  setting a coefficient that the route assignment evaluation value becomes larger than a predetermined value when a plurality of time-series route candidates are selected for each of the plurality of mobile objects.

17. The route estimation method according to claim 9, further comprising:
  calculating the travel distance evaluation value by setting a different coefficient for each of the plurality of mobile objects according to a priority that the travel distance evaluation value of one of the mobile objects having a higher priority becomes smaller.

18. The route estimation method according to claim 9, further comprising:
  setting a coefficient that the route collision evaluation value becomes larger than a predetermined value when the plurality of mobile objects collide with each other.

19. The route estimation method according to claim 9, further comprising:
  when the shortest route of each of the plurality of mobile objects does not overlap with each other, the shortest route is estimated as the optimum route.

* * * * *